United States Patent
Urban

(10) Patent No.: US 9,718,626 B2
(45) Date of Patent: Aug. 1, 2017

(54) CLEANING MECHANISM FOR USE WITH A CLOSED LOOP CONVEYOR BELT

(71) Applicant: Keith Urban, Waterford, MI (US)

(72) Inventor: Keith Urban, Waterford, MI (US)

(73) Assignee: Keith Urban, Troy, MI (US)

(*) Notice: Subject to any disclaimer, the term of this patent is extended or adjusted under 35 U.S.C. 154(b) by 0 days.

(21) Appl. No.: 15/348,701

(22) Filed: Nov. 10, 2016

(65) Prior Publication Data

US 2017/0129713 A1 May 11, 2017

Related U.S. Application Data

(60) Provisional application No. 62/253,466, filed on Nov. 10, 2015.

(51) Int. Cl.
| | |
|---|---|
| *B65G 45/18* | (2006.01) |
| *B65G 45/24* | (2006.01) |
| *B65G 45/16* | (2006.01) |
| *B65G 45/26* | (2006.01) |

(52) U.S. Cl.
CPC ............ *B65G 45/24* (2013.01); *B65G 45/16* (2013.01); *B65G 45/18* (2013.01); *B65G 45/26* (2013.01)

(58) Field of Classification Search
CPC ........ B65G 45/10; B65G 45/18; B65G 45/24; B65G 45/26
USPC ................................................ 198/496, 494
See application file for complete search history.

(56) References Cited

U.S. PATENT DOCUMENTS

| | | | |
|---|---|---|---|
| 3,913,728 A | 10/1975 | Pott | |
| 4,116,326 A | 9/1978 | Tuman | |
| 4,155,442 A | 5/1979 | Gosling et al. | |
| 4,499,992 A | 2/1985 | Paulson et al. | |
| 4,840,267 A | 6/1989 | Pine | |
| 4,913,279 A | 4/1990 | Tonissen | |
| 4,960,200 A * | 10/1990 | Pierce | B65G 45/24 198/495 |
| 5,161,666 A | 11/1992 | Pope | |

(Continued)

FOREIGN PATENT DOCUMENTS

GB 2067497 * 7/1981 ............ B65G 45/24

*Primary Examiner* — James R Bidwell
(74) *Attorney, Agent, or Firm* — Dinsmore & Shohl LLP

(57) ABSTRACT

A cleaning mechanism for use with a closed loop conveyor belt supported in continuous traversing fashion. The mechanism includes a housing for supporting the belt, a frame mounted to the housing proximate to the belt. A drive shaft extends between spaced apart locations of the frame and includes a pair of head sprockets adapted for supporting the belt at a selected location. A motor is engaged to an input end of the drive shaft. A counter weighted comb element is pivotally secured to the frame, an upper angled combed edge of the comb element arrayed in spatial non-contacting fashion with a traversing exterior of the belt for capturing elongated shaving debris suspended from the belt. A slave shaft extends between additional spaced apart location of the frame and which is rotated via a linkage with the drive shaft. Pluralities of bristles extend from the slave shaft in a cylindrical arrangement such that selected width extending portions of the bristles are arranged in successive contact with the belt upon rotation of the slave shaft in order to scrub the belt.

20 Claims, 13 Drawing Sheets

(56) References Cited

U.S. PATENT DOCUMENTS

| | | | |
|---|---|---|---|
| 5,400,897 A * | 3/1995 | Doyle | B65G 45/18 |
| | | | 198/496 |
| 5,497,872 A | 3/1996 | Pennino | |
| 5,649,616 A * | 7/1997 | Stecklow | B65G 45/24 |
| | | | 198/495 |
| 5,779,024 A * | 7/1998 | Harper | B65G 45/18 |
| | | | 198/496 |
| 6,601,692 B2 * | 8/2003 | Schaefer | B65G 45/18 |
| | | | 198/496 |
| 6,926,133 B2 | 8/2005 | Kolodziej et al. | |
| 6,964,331 B1 * | 11/2005 | Kerr | B65G 45/18 |
| | | | 198/496 |
| 8,191,701 B2 | 6/2012 | Bryl et al. | |
| 8,348,046 B1 * | 1/2013 | Baumgardner | B65G 45/24 |
| | | | 198/495 |
| 2002/0070096 A1 | 6/2002 | Swinderman | |
| 2003/0155211 A1 * | 8/2003 | Mott | B65G 15/42 |
| | | | 198/496 |
| 2006/0021855 A1 | 2/2006 | Kolodziej et al. | |
| 2010/0243410 A1 | 9/2010 | Hall et al. | |
| 2012/0199443 A1 * | 8/2012 | Kaneyama | G03G 15/161 |
| | | | 198/496 |

* cited by examiner

CLEANING MECHANISM FOR USE WITH A CLOSED LOOP CONVEYOR BELT

CROSS-REFERENCE TO RELATED APPLICATIONS

This Application claims the benefit of U.S. Provisional Application 62/253,466 filed on Nov. 10, 2015, the contents of which are incorporated herein in its entirety.

FIELD OF THE INVENTION

The present invention discloses a cleaning mechanism for use with any style of conveyor belt, not limited to closed loop, and with such belts further including a variety having pivotally interconnecting links configured in a tread or track arrangement. Without limitation, the conveyor belts described herein can include other designs and are utilized in the transferring of parts from a machining type operation not limited to broaching and other operations which are attendant with the creation of burrs, chips or other debris.

More particularly, the present invention discloses an assembly, such as which can be located at a looped or directionally reversing underside location of the continuous belt for providing two stage cleaning of the belt following transferring of the conveyed parts. This can include a first step removal of elongated or helical shavings and debris (also termed birds nests), following which an adjustable and rotating brush provides for scrubbing removal of remaining debris for gravity collection within an underside positioned catch bin.

BACKGROUND DESCRIPTION OF THE RELEVANT ART

The prior art is well documented with examples of conveyor cleaning and wiping devices. These include numerous types of scraper and cleaner devices such as which are utilized with smooth belt surfaces of the conveyor. A first example of this is the two piece scraper blade of Kolodziej, U.S. Pat. No. 6,926,133. Additional examples include the elongated wiping arm of Pott, U.S. Pat. No. 3,913,728, the self-cleaning support roller of Paulson, U.S. Pat. No. 4,499,992, the rotatable cleaning rollers of Pine U.S. Pat. No. 4,840,267, the self cleaning conveyor roller of Tonissen U.S. Pat. No. 4,913,279.

As opposed to smooths surface continuous belt conveyors, other types of cleaning mechanisms are known for cleaning the grates or bars of a conveyor, such as applied to a vibrating bark, sawdust and material conveyors. An examples of this is the vibrating conveyor bar cleaning system of Tuman, U.S. Pat. No. 4,116,326, and which includes a plurality of oscillating teeth in contact with an underside of the grate or bar network in a raking action such that the teeth change direction automatically at each end of travel.

SUMMARY OF THE PRESENT INVENTION

The present invention discloses a cleaning mechanism for use with any style of conveyor belt and in particular for use with link style open conveyor belts of a type particularly suited for transporting parts. These can further include parts associated with any machining operation not limited to broaching operations and in which the parts are deposited upon or acquired by the belt as its translates through a coolant or lubricant reservoir within which the parts are located.

The belt as previously described can include a variety having pivotally interconnecting links configured in a tread or track arrangement. Without limitation, the conveyor belts described herein can include other designs and are utilized in the transferring of parts from a machining type operation not limited again to broaching and other operations which are attendant with the creation of burrs, chips or other debris.

An assembly is located at a looped underside location of the continuous belt for providing two stage cleaning of the belt following transferring of the conveyed parts, this including a first step removal of elongated or helical shavings and debris (also termed birds nests), following which an adjustable and rotating brush provides for scrubbing removal of remaining debris for gravity collection within an underside positioned catch bin. In a broadest application, the cleaning mechanism includes a housing for supporting the belt, a frame mounted to the housing proximate to the belt, a drive shaft extending between spaced apart locations of the frame and including a pair of head sprockets adapted for supporting the belt at a selected location. A motor engages an input end of the drive shaft.

A counter weighted comb element is pivotally secured to the frame, an upper angled combed edge of the comb element being arrayed in spatial non-contacting fashion with a traversing exterior of the belt for capturing elongated shaving debris suspended from the belt. A slave shaft extends between additional spaced apart location of the frame and which is rotated via a linkage with the drive shaft, with pluralities of bristles extending from the slave shaft in a cylindrical arrangement such that selected width extending portions of the bristles are arranged in successive contact with the belt upon rotation of the slave shaft in order to scrub the belt.

Additional features include the housing having a pair of planar and widthwise spaced apart supports, such as which are mounted to the spaced apart locations of the the frame and through which the drive shaft passes, the receiving supports including internal bearings. The counterweighted comb element can further include a multi-sided elongated and planar body including a main portion having a bottom extending counterweight, an intermediate planar side, and an upper end most interconnected planar extending side terminating in a forward serrated or comb-like edge with individual fingers.

Additional features of the comb element include a pair of rake arms position along opposite side edges thereof, the rake arms including both outer projecting and forward-most extending edges which contact the belt and which position the upper end most interconnecting planar side of the comb element in spatial and non-contacting fashion against the belt. Other features include a sacrificial wear surface applied to the rake arms in engagement with the belt.

The cleaning mechanism also includes first and second sprocket wheels secured respectively to extending ends of the drive shaft and slave shaft, a chain interconnecting the sprocket wheel for transferring rotational momentum of the drive shaft to the slave shaft. A pair of pillow blocks are secured to the spaced apart locations of the frame and through which is supported the slaved shaft.

First and second pluralities of aligning and angled slot shaped apertures are configured within the spaced apart locations, the pillow blocks being adjustable along the pluralities of apertures in order to positionally adjust the slave shaft and bristles relative to the belt. The bristles are mounted to an outer sleeve supported about the slave shaft, a shear pin extending between the sleeve shaft and outer sleeve, typically in engagement with a keyed location on the slave shafe and which, upon jamming, allows the rotating brush assemblies supported about the outer sleeve to decouple from the inner rotating slave shaft and to become stationary.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 3:
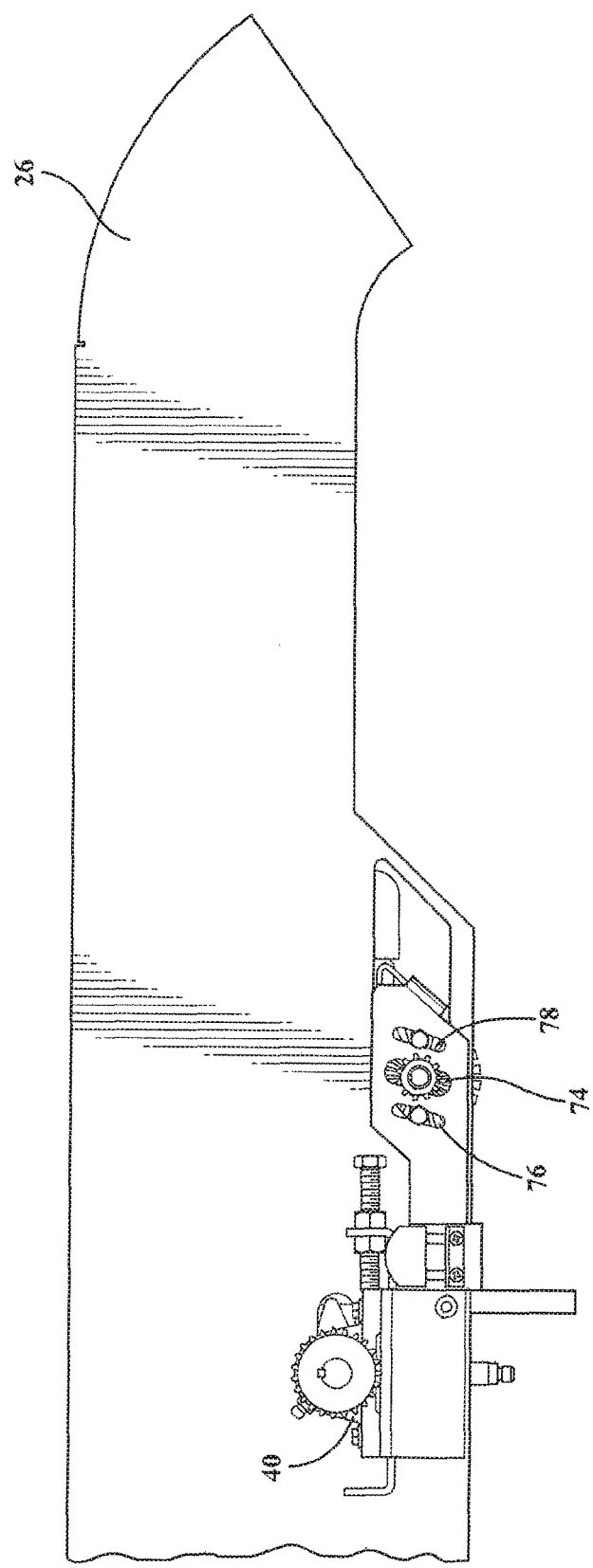
FIG. 3 is a side plan illustration of the conveyor in FIG. 1 and showing the assembly drive shaft arranged in combination with the position adjustable brush drive slave shaft.
Figure 4:
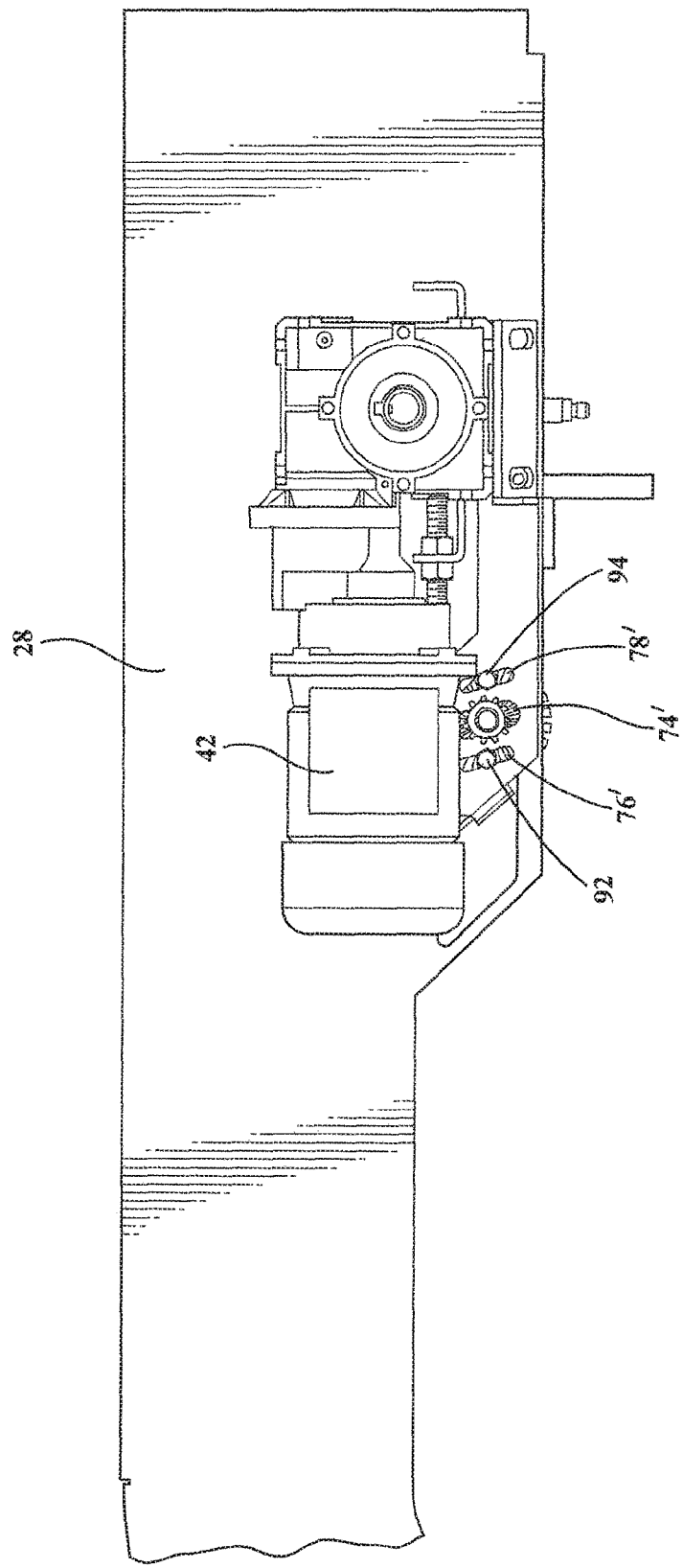
FIG. 4 is a rotated side plan view of the conveyor shown in FIG. 3 and further depicting the gear motor and housing.
Figure 5:
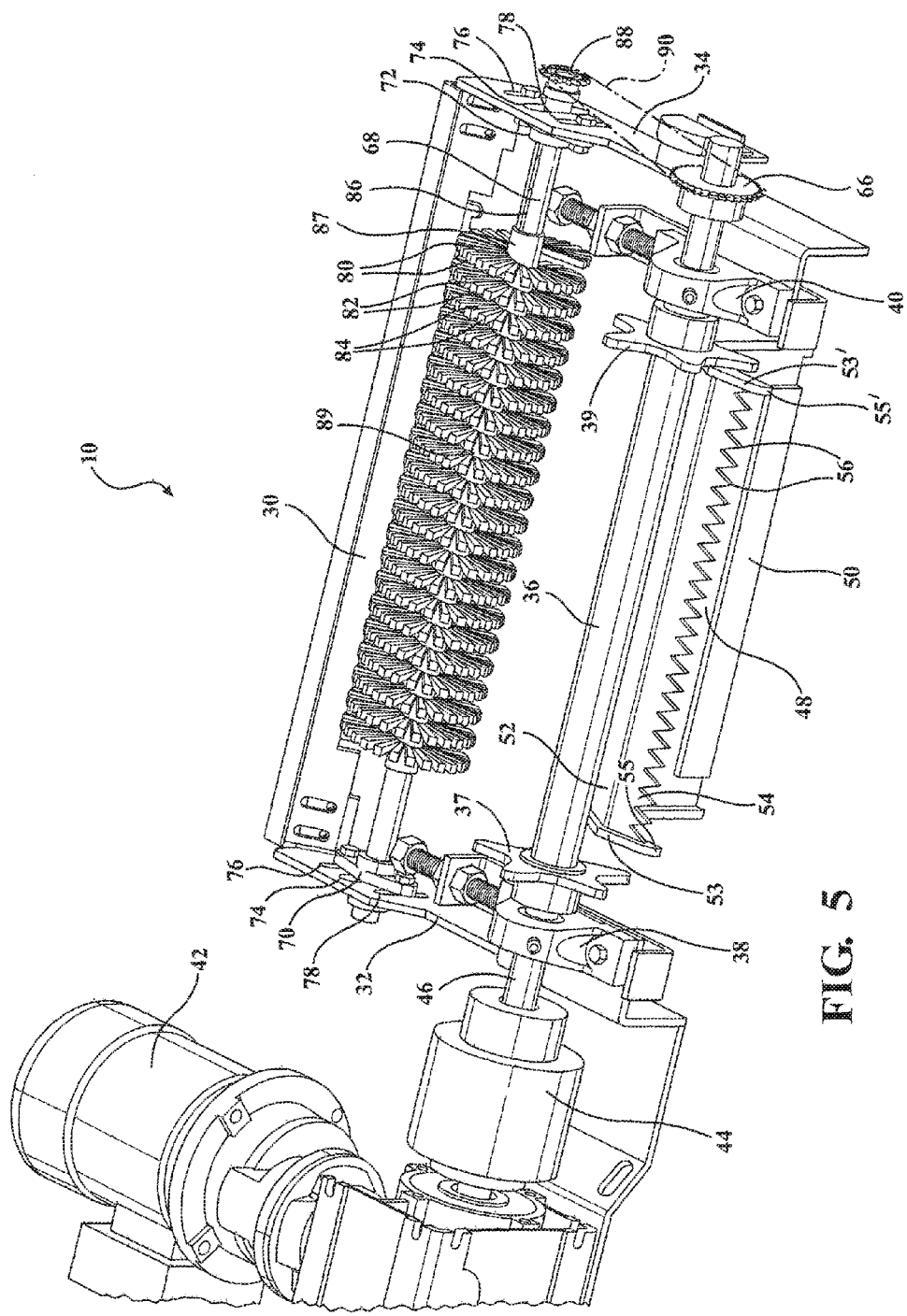
FIG. 5 is an enlarged perspective of the closed belt cleaning mechanism components without the conveyor housing or interlocking and part supporting treads.

Referring now to FIGS. 1-12, the present invention discloses a cleaning mechanism, see as generally referenced at 10 in FIG. 5, for use with a tread style conveyor belt. More particularly, and as previously described, the present invention discloses an assembly such as which is positioned at a looped underside location of the continuous belt for providing two stage cleaning of the belt following transferring of the conveyed parts, this including a first step removal of elongated or helical shavings and debris (also termed birds nests), following which an adjustable and rotating brush provides for scrubbing removal of remaining debris for gravity collection within an underside positioned catch bin.

As will be further described, the present inventions contemplate any variant of cleaning mechanism utilizing either or both of shaving removal and/or scrubbed cleaning f any tread or smooth surfaced continuous loop conveyor.

Figure 6:
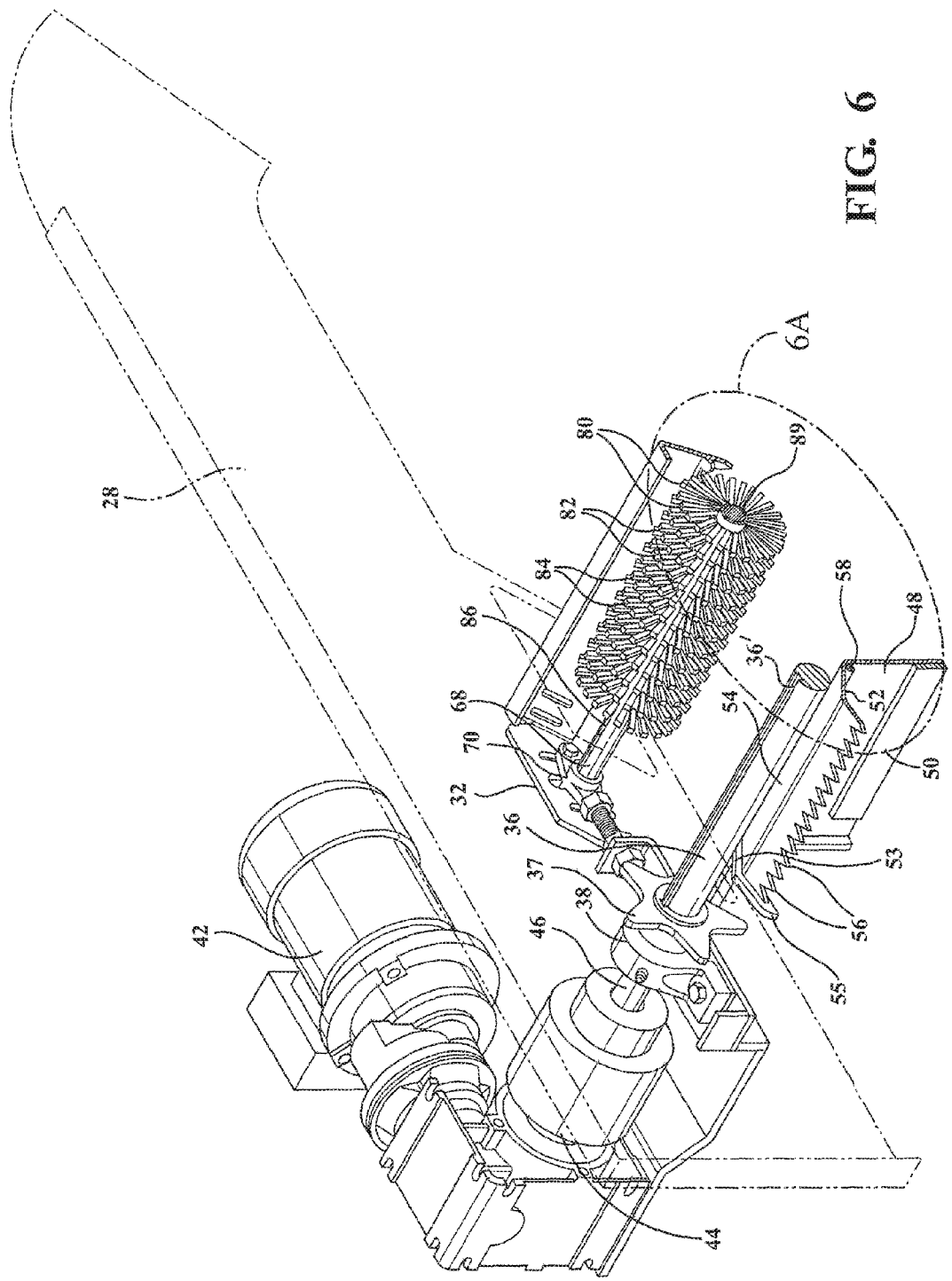
FIG. 6 is a further rotated and perspective cutaway of the assembly and further depicting the counterweighted comb element for assisting in removing birds nest debris in combination with the position adjustable and slaved rotatable cylindrical shaped brush element.
Figure 6A:
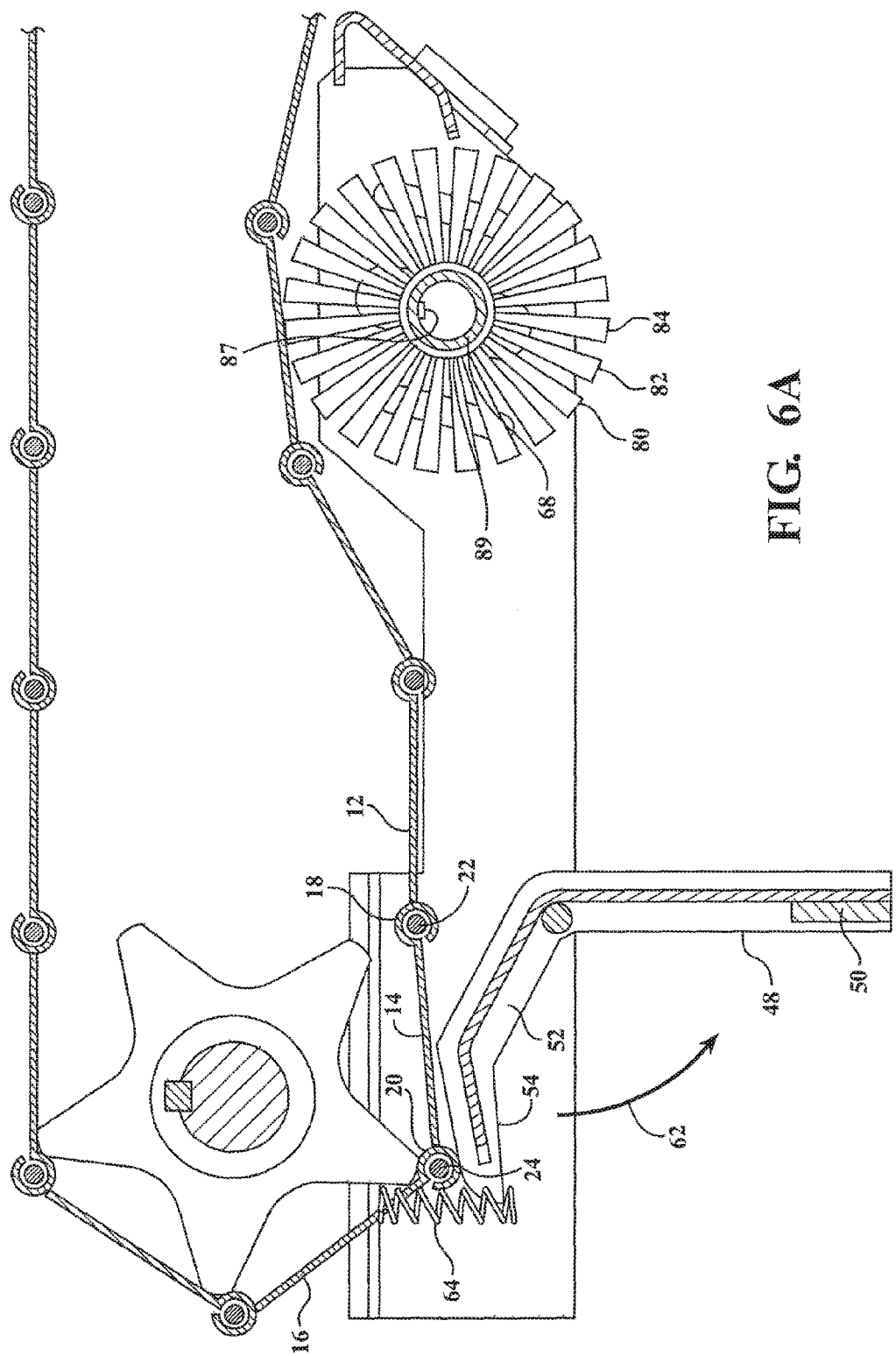
FIG. 6A is a partial plan cutaway illustrating the angled tips of the counterweighted comb element and the manner in which they assist in removing debris from the closed loop conveyor.

In one non-limiting application, the conveyor belt can include a plurality of inter-linked components, see as shown at 12, 14, 16, et. seq. in side profile in FIG. 6A, of which each further includes an arcuate end, see at 18 for linked component 12 and further at 20 for linked component 14, et seq., and within which is rotatably seated a circular cross sectional portion, see further at 22 for linked component 14 and at 24 for linked component 16. The configuration of the arcuate ends 18, 20, et seq. is further such that they are arranged in a width spaced apart fashion or define a continuous width extending extrusion which include apertures or slots along their inner walls in order to allow for mounting of the circular end portions 22, 24, et seq. of each succeeding link. In this fashion, and as again shown in. FIG. 6A, the respective links are capable of pivoting relative to one another during such as a closed loop traversal, similar, to that depicted by a tank tread or the like.

Built into the support structure for the closed loop belt are a pair of planar and widthwise spaced apart supports 26 and 28 (see FIGS. 1-3), these supporting the framing structural components associated with the components of the cleaning mechanism and such that the outer supports 26 and 28 are built into the overall housing or support structure of the closed loop conveyor. In this fashion, the counterweight comb and rotating brush elements of the cleaning mechanism are positioned at an external contacting location approximate an underside return conveying direction of the belt.

As indicated, the present invention is intended to provide for cleaning of a closed looped belt, such as which is incorporated into a part transfer assembly associated with such as a broaching or other machining operation which is attendant with the creation of a large volume of shavings and other debris. Although not shown, the parts are often conveyed along the belt (often in a wet condition resulting in the belt emerging from a submerged coolant or the like within which the parts were previously deposited). Following the parts being transferred to a separate conveyor or otherwise deposited from the belt, the underside/reverse conveying location of the belt comes into contact with the components of the cleaning mechanism, with a bin or other suitably dimensioned collection container (see partial illustrated fashion at 29 in FIG. 12) and which his provided underneath the cleaning mechanism for collecting the debris and other particles cleaned from the belt in the manner which will now be described.

As best shown in FIGS. 1-5, the framing structural components of the belt cleaning mechanism are best depicted. (FIG. 5) by interconnected width extending member 30 and parallel spaced apart side members 32 and 34. The extending member 30, also termed a brush comb/cleaner, operates to remove debris collected by the brush bristles (see as further described at 80, 82, 84, et seq.) after contact with the belt to be cleaned. The brush comb is adjustable relative to the rotating bristles (such as incrementally or by any measurement scale including, millimeters, inches etc.) to compensate for diameter wear of the bristles, as well as adapt to the orientation of the brush centerline within its own adjustable slots/tracks (as further depicted by opposing pluralities of angled slots at 74, 76 and 78 which allow for bristle wear compensating repositioning of the shaft).

A drive shaft 36 is supported at a first width extending location between the side structural members 32 and 34, via a pair of receiving supports 38 and 40 mounted to the structural members 32 and 34 and between which the drive shaft 36 is secured in rotationally driven fashion. Also best shown at 37 and 39 in FIG. 5 are a pair of width spaced apart head drive sprockets, these mounted to the drive shaft.

The head sprockets 37/39 are integrated into the drive assembly of the continuous belt and support the continuously conveying tread style belt at one inner supporting location. As further best shown in FIG. 6, the drive shaft 36 can be keyed (see axial extending exterior location 36') in order to mount the belt driving head sprockets 37/39. As further shown, the receiving supports 38/40 include internal bearings, a first inlet end of the drive shaft 36 being driven by a gear motor 42 via associated bevel gearing including, without limitation, such as a ninety degree offset component 44 (FIGS. 2 and to which the inlet end of the shaft 36, see at 46 in FIGS. 5 and 6, is secured. The exploded view of FIG. 11 further depicts a bracket support 41 for the motor. A pair of end supports 43 and 45 are further depicted in FIG. 11 for supporting opposite ends of the drive shaft 36.

Figure 7:
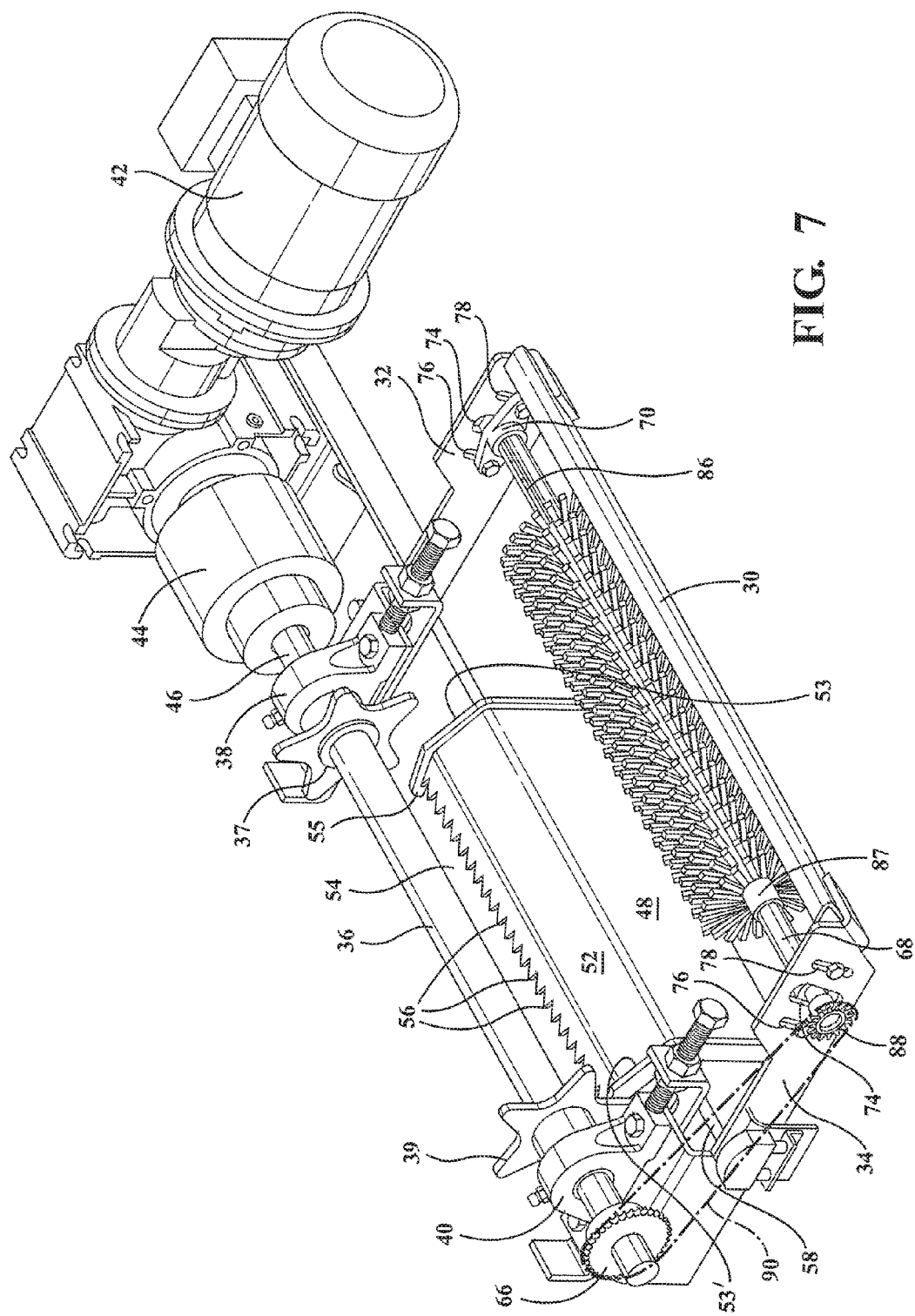
FIG. 7 is a further rotated perspective of the cleaning mechanism as shown in FIG. 5.
Figure 8:
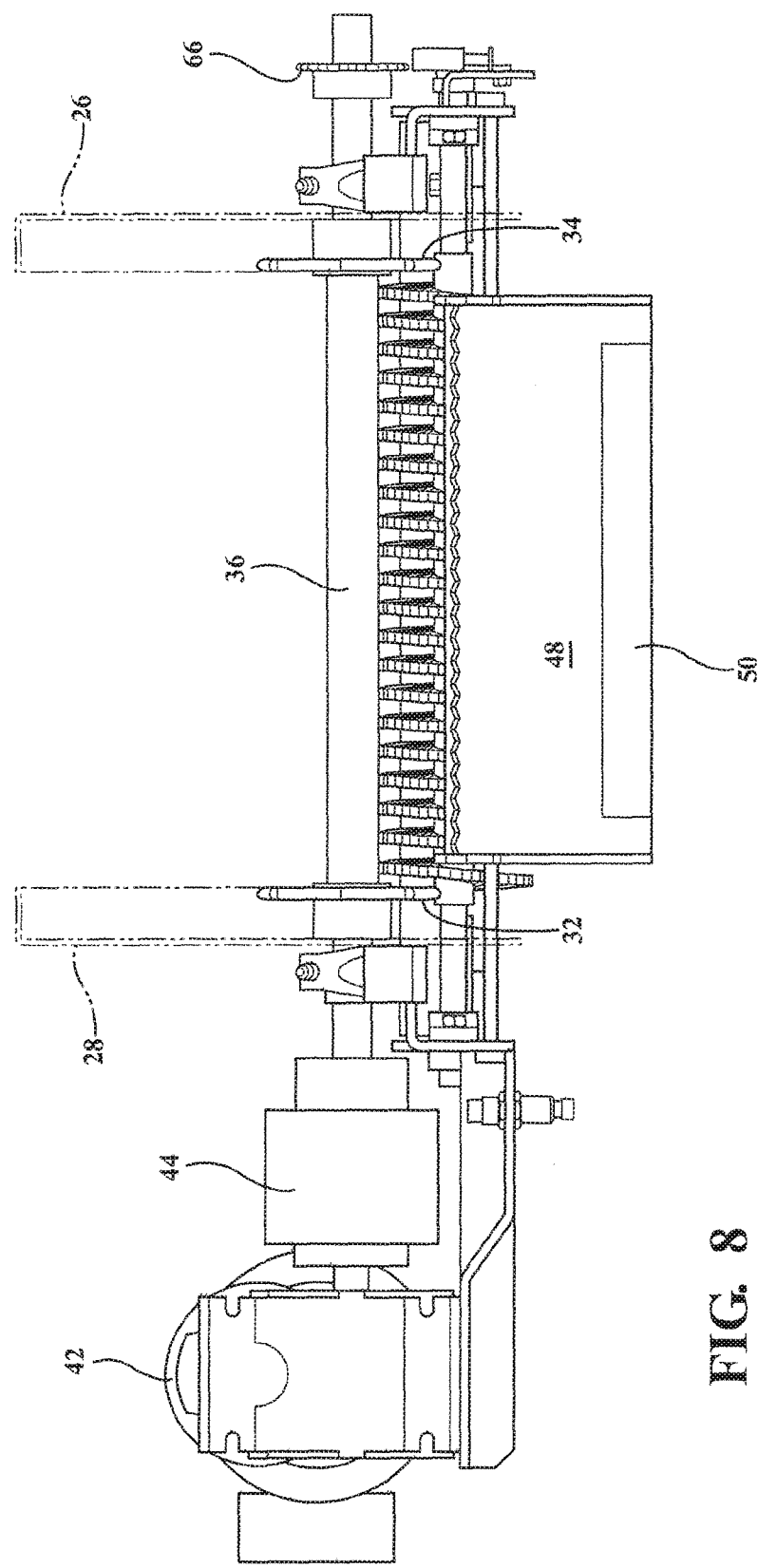
FIG. 8 is an end plan view of the cleaning mechanism.
Figure 9:
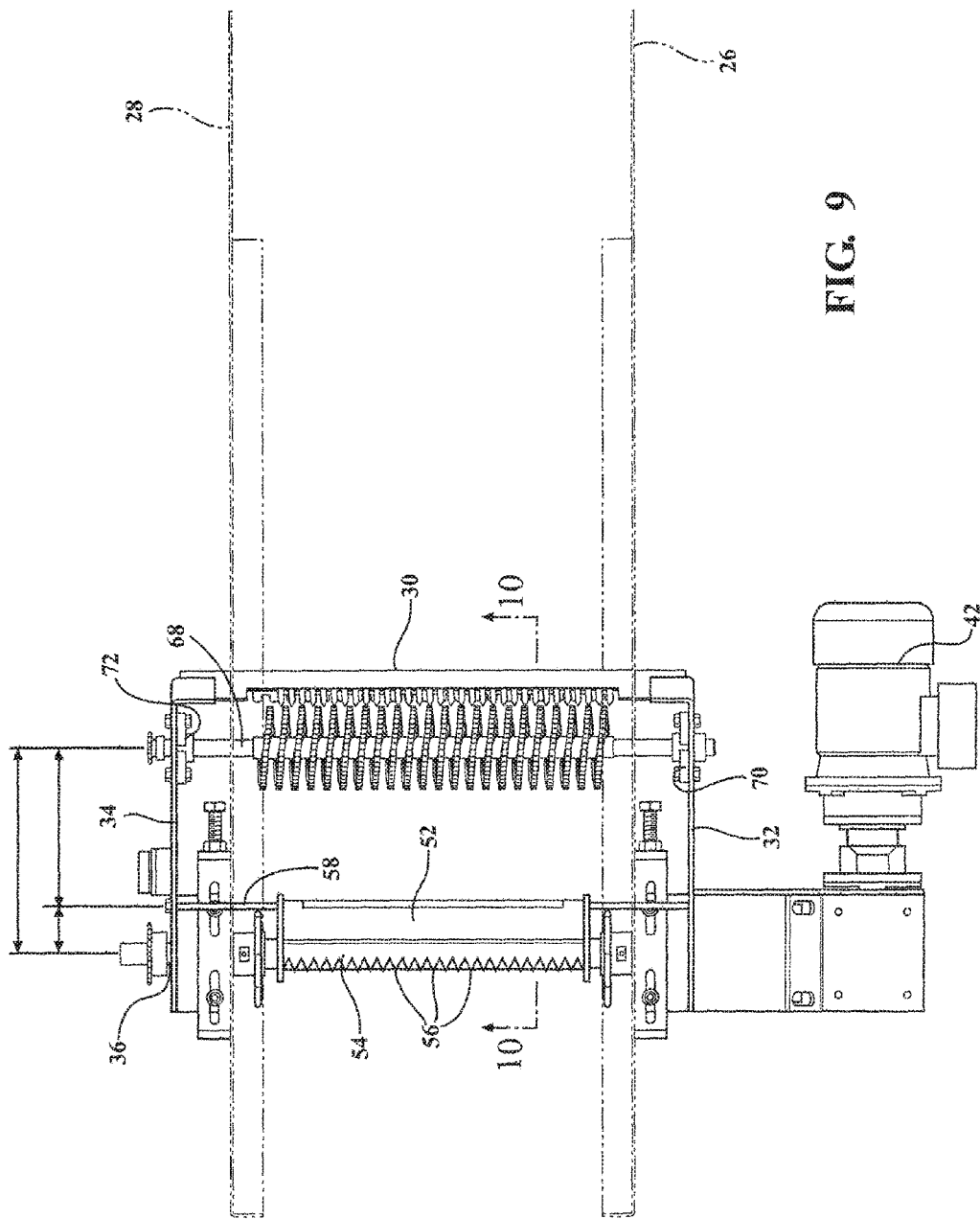
FIG. 9 is a top plan view of the cleaning mechanism.

As best shown in FIGS. 5-7, the counterweighted comb element is depicted according to one non-limited variant by a multi-sided elongated and planar body including a main portion or side 48 having a bottom extending counterweight 50. The comb element further includes both intermediate 52 and end most 54 interconnected planar extending sides and terminates in a forward serrated or comb-like edge with individual fingers (also termed tips or prongs) 56.

A pair of rake arms 53 and 53' (FIGS. 5-7) are configured on opposite extending ends of the counterweighted comb element and provide mechanical leverage in order to pull debris which may be clinging from the underside of the linked or otherwise constructed belt. The rake arms 53/53' also provide minimal friction locations in contact with the conveyor belt and act as sacrificial wear surfaces.

To assist in providing the sacrificial wear properties, the rake arms 53/53' may also be coated with a UHMW (ultra high molecular weight) plastic or other low friction wear material to avoid wearing of the belt. The dimensioning and configuring of the rake arms is further such that the intermediate extending surfaces of the multi-sided comb approach but do not contact the traveling underside of the belt, the spatial definition being adequate to remove such as helical or other irregular shaped burrs/debris from the belt. The rake arms also include forward most sloped edges, see at 55 and 55' for rake arms 53 and 53' respectively (again FIG. 5), the purpose for these being to further assist in positioning the serrated leading edge (again fingers or prongs 56) of the comb element in optical non-contacting position to the belt surface for intercepting and removing the debris.

Figure 10:
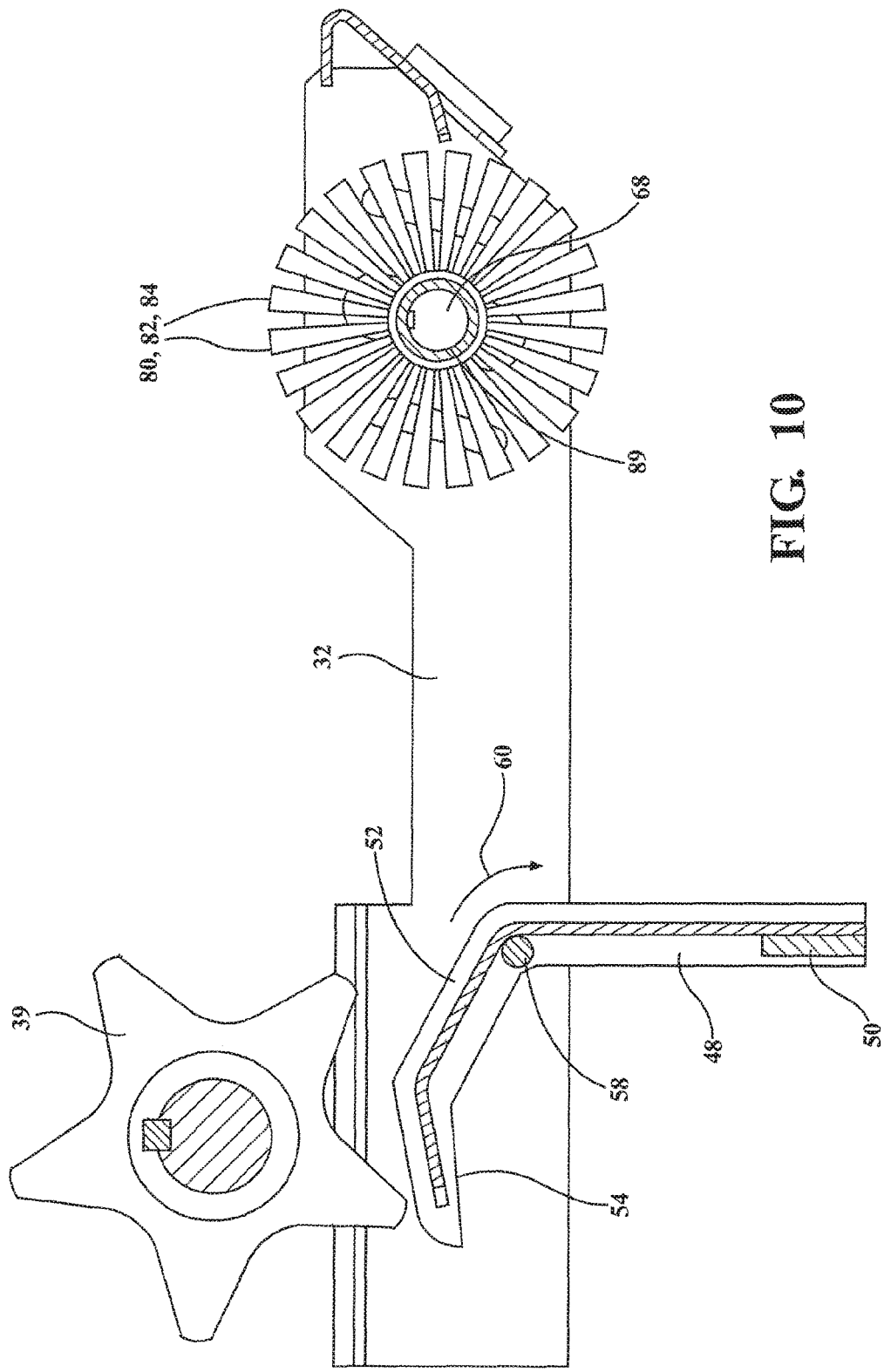
FIG. 10 is a further side cutaway taken along line 10-10 of FIG. 9 and better showing in side profile the counterweighted comb element along with position adjustable and slaved rotatable cylindrical shaped brush element.
Figure 11:
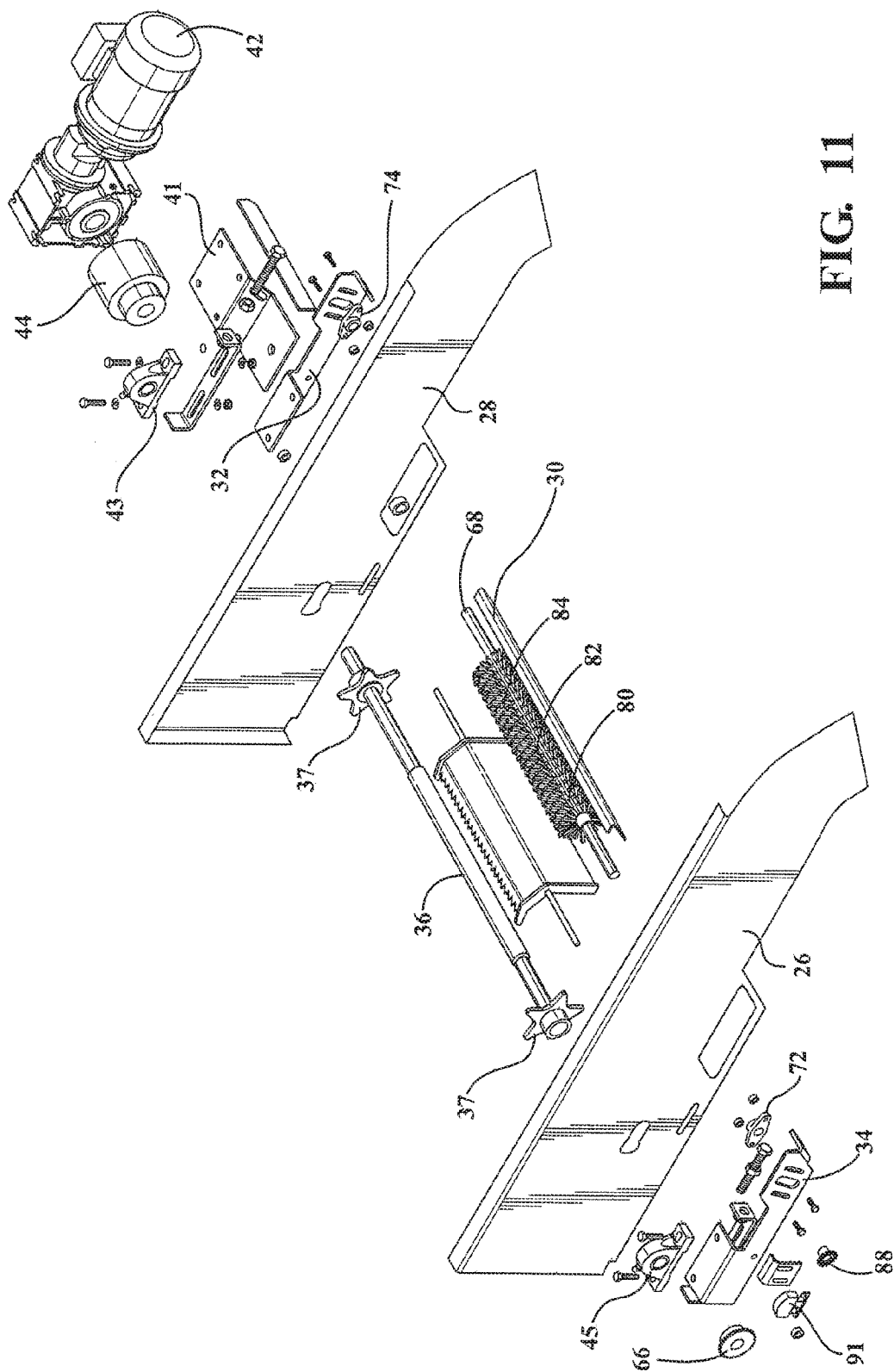
FIG. 11 is an exploded view of the cleaning mechanism for use with a closed loop conveyor belt.
Figure 12:
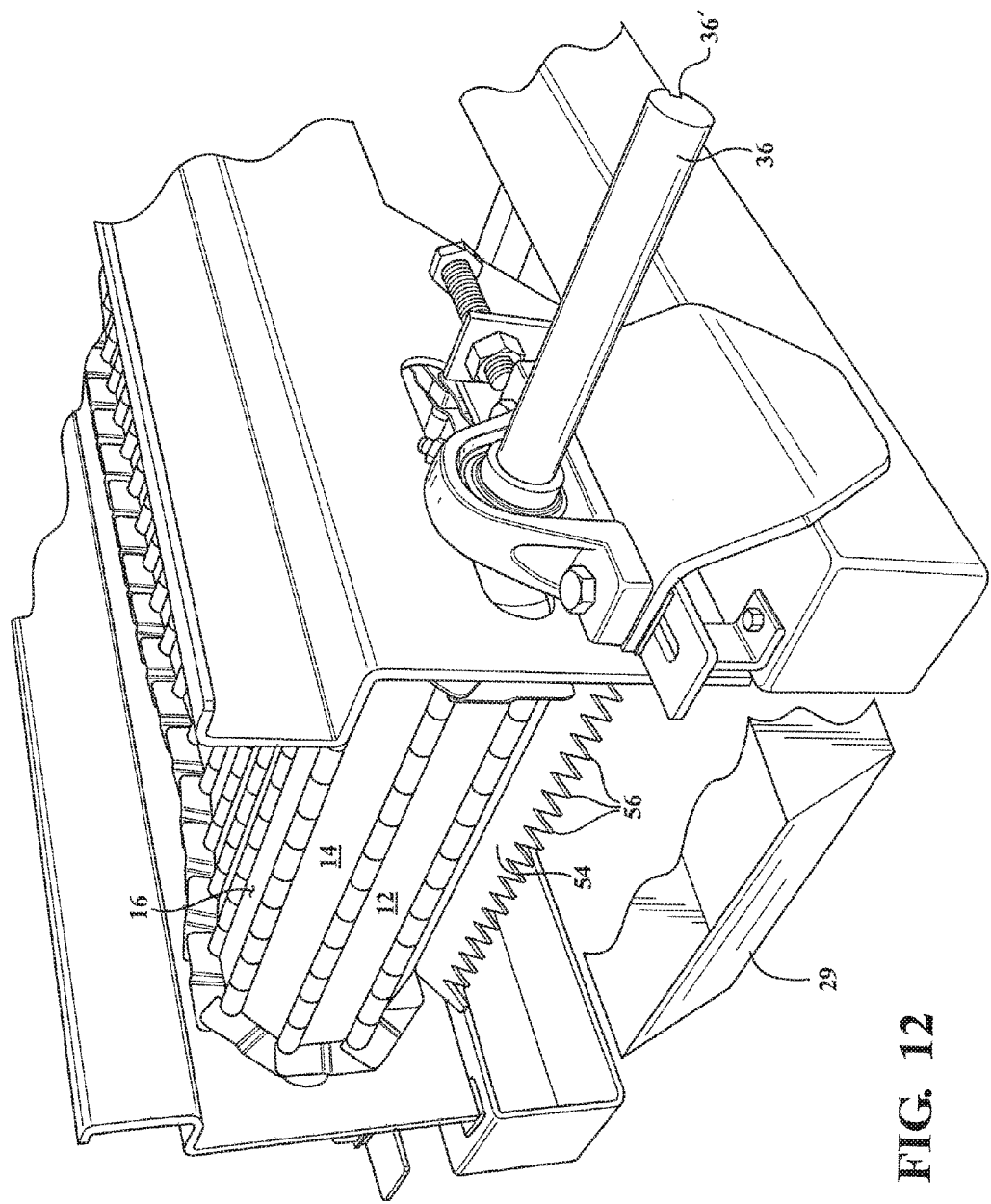
FIG. 12 is a partial and environmental perspective of the chain drive belt and cleaning mechanism integrated into a continuous looped link belt according to one non-limiting application of the present invention.

As further best shown in FIG. 6, a fixed elongated and widthwise extending support 58 extends parallel to and underneath the drive shaft 36, the comb element being pivotally secured to the widthwise extending support 58 at the angled interconnection between the main portion 48 and the intermediate side 52 in the manner best depicted in each of the cutaway perspective of FIG. 6 and the side plan cutaway of FIG. 10. In this fashion, and referring again to FIG. 6A, bottom secured counterweight 50 counterbalances the comb element such that it is pivoted in a clockwise direction 60 referenced in FIG. 10, this causing the angled tips or fingers 56 of the counterweighted comb element to travel in slightly spaced apart fashion relative to the bottom of the pivotally interconnected links 12, 14, 16, et seq. constituting the closed loop belt (FIG. 6A), and as further facilitate by the rake arms 53/53' providing sacrificial wear engagement with the belt.

As further shown, the fingers are located proximate to the individual arcuate link ends 18, 20, et. seq., and, upon the rake arms iteratively contacting the belt, are caused to likewise iteratively counter rotate in a counter clockwise direction (see at 62 in FIG. 6A) away from the belt surface. As previously described, the fingers contact elongated debris particles (in industry terms including such as helically wound shavings or "birds nests" as depicted at 64 in FIG. 6A), the removal of which is facilitated by the comb element being forced away from the belt in a rotating motion of the fingers which causes the elongated debris shavings to be redirected from the underside location of the conveyor belt to the underside positioned catch bin. Beyond that illustrated, the present invention also contemplates the comb element being redesigned to incorporate any type of pivoting or other displaceable width extending member, such as which may not require a counterweighting aspect.

Figure 1:
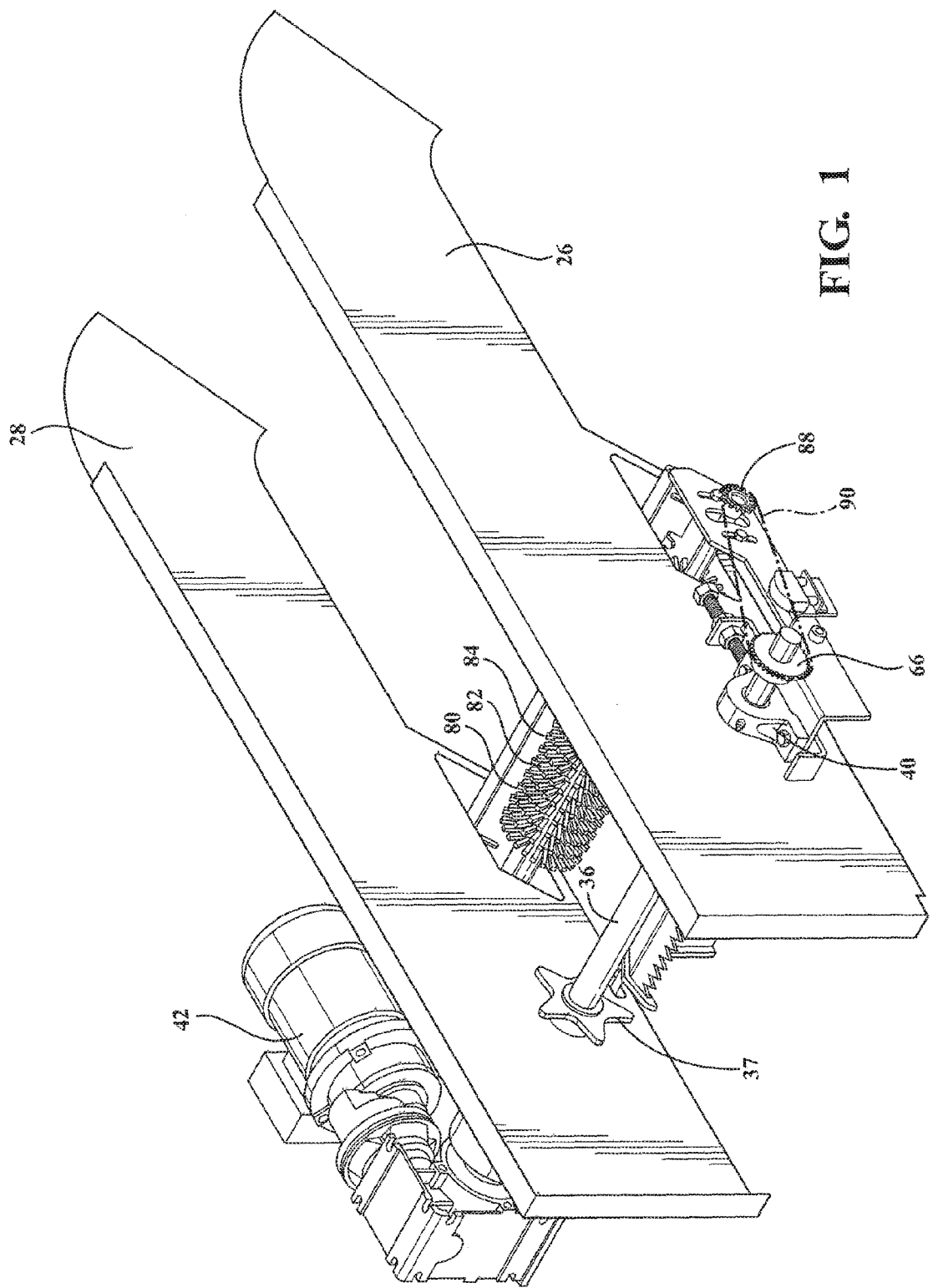
FIG. 1 is a perspective illustration of the cleaning mechanism according to one non-limiting variant with the closed loop tread-style conveyor belt removed.
Figure 2:
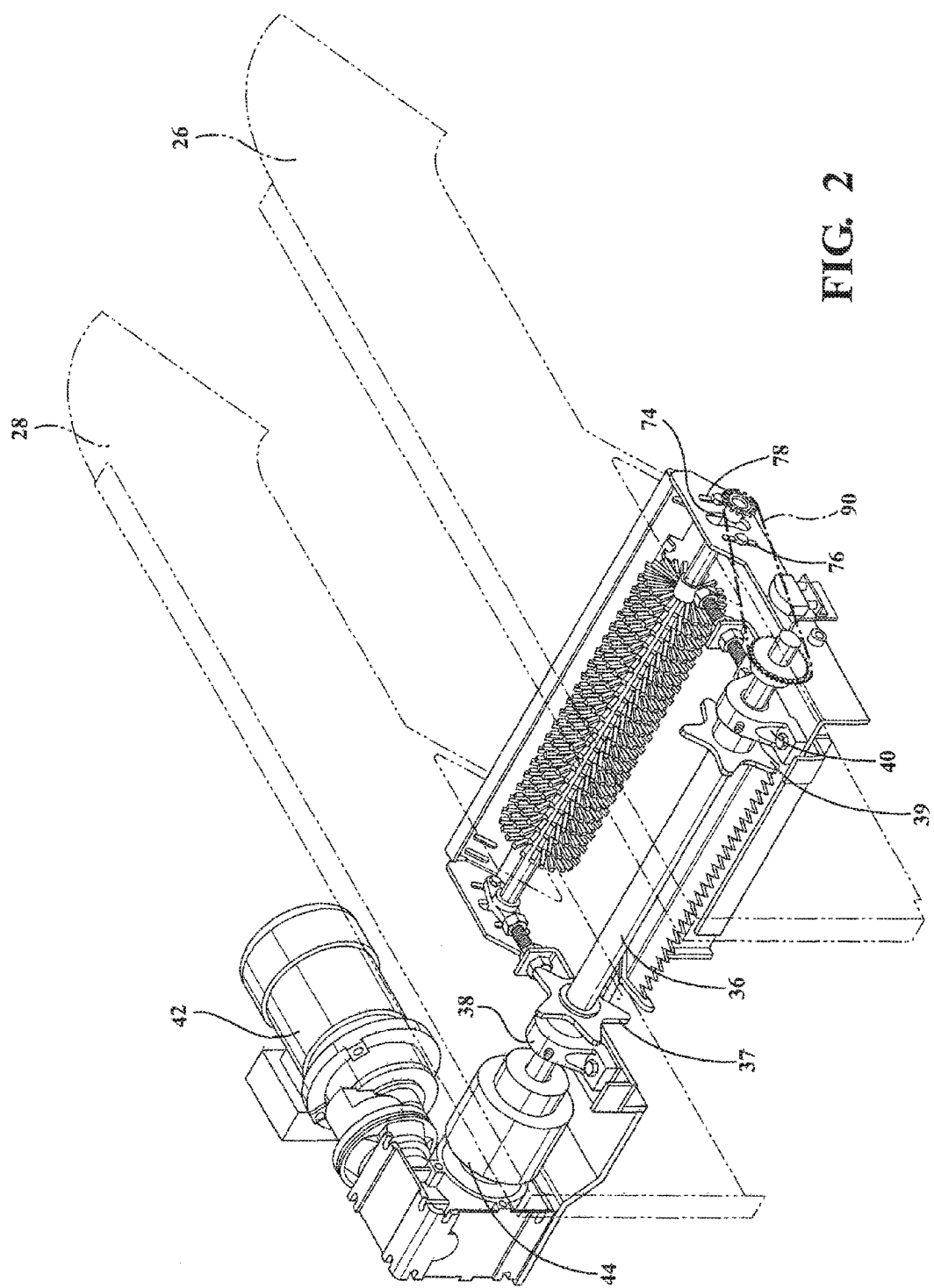
FIG. 2 is a similar illustration to FIG. 1 and illustrating in see through fashion the structural side supports of the looped conveyor.

As again best shown in FIGS. 1, 5 and 7, the underside mounted frame structure (again at 30, 32 and 34) of the belt cleaning mechanism is again secured to underside locations of the belt housing supports 26 and 28 (see again FIG. 1), with the drive shaft 36 projecting through both spaced apart housing supports and, at an end-most extending location beyond the outermost support 26, terminating in a first sprocket wheel 66. A slaved shaft 68 is also provided, see as best shown in FIGS. 5-7, and which is mounted in extending fashion between the outer parallel spaced sides 32 and 34 of the belt cleaning structure As further understood, the side extending frame members 32 and 34 also provide the critical feature of maintaining dimensioning over the entire belt tensioning range by maintaining consistent spacing between each of the drive shaft 36, the rake pivot support 58 and the slave shaft 68 (see as best depicted in overhead view of FIG. 9).

Also shown are a pair of pillow blocks, see at 70 and 72 (FIGS. 6-7 and 9), which support the slaved shaft 68. As shown, the slaved shaft 68 extends through aligning and angled slot shaped apertures configured within each of the outer frame or side members 32 and 34. For purposes of ease of illustration, reference is made to the outer side member 34 including an inner elongated closed profile 74 defining a given side aperture for receiving the shaft 68, with a pair of adjoining outer slotted profiles 76 and 78 extending in parallel and which provide for oblique adjustment of the associated and inner side supported pillow block 72, an identical arrangement being configured with association to the inner pillow block (FIGS. 6 and 7) secured against an inside surface of the inner side 32.

An outer bristle support sleeve 89 surrounds the slaved shaft 68 and is likewise oblique adjustable along the parallel inner and outer slots supporting the shaft and pillow block mounting bolts. A shear pin 87 interconnects the shaft 68 with the outer sleeve 89, upon which the bristle bunches are supported (see also FIG. 6A). Fracturing of the shear pin 87 operates to allow the brush assembly to become stationary if jammed, and without overloading the main drive motor 42 and by permitting the outer brush supporting sleeve 89 to decouple from the slaved shaft 68 upon rotating brushes becoming lodged or stuck for any reason.

Pluralities of bunches of stiff bristles, see at 80, 82, 84, et seq. in FIG. 6, extend from the slaved shaft in axially/width spaced apart fashion such that the bristles, in combination, define an overall cylindrical shape extending the width of the proximately conveying belt. The slaved shaft 68 is also keyed, see at 86 in FIGS. 5-7, and terminates beyond the outer housing support 26 in a second sprocket wheel 88, such that a chain 90 extending between the first 66 and second 88 sprocket wheels and so that rotation of the drive shaft 36 in a given direction results in a concurrent rotation of the slaved shaft 68. A bracket 91 (see FIG. 11) is also shown for supporting the frame component 34.

In this fashion, the slaved shaft 68 with the pluralities of bristles 80, 82, 84, et seq. can be obliquely repositioned along the direction established by the slot shaped support apertures 74, 76 and 78 (as best shown in FIG. 3 and corresponding to an identical and aligning set of apertures 74', 76' and 78' associated with the opposite support housing 28 as best shown in FIGS. 4 and 6). The pair of mounting bolts (see at 92 and 94 in FIG. 4) associated with each of the pillow blocks 70 and 72 in FIG. 5 are selectively loosened to at both ends to permit the slaved shaft 68 and its associated cylindrical array of bristles to be repositioned in a manner towards or away from the underside traversing links of the belt drive and, in this fashion, the rotation of the drive shaft 36 (such as in a counter clockwise direction). As a result, this causes the underneath traversing belt to contact the tips of the arcuate rotating bristle bunches in a counter directing fashion, i.e. the underside traveling belt links are in a direction counter to the upper arcuate sweep of the ccw (counter clockwise rotating) bristles such that their tips abrade the exterior surface of the belt links, in order to help sweep away the remaining debris or particles not previously removed by the combed edge 56 of the counterweighted comb element.

While, as previously described, the cleaning mechanism is typically located at an external underneath location of the belt, it is further understood that the comb element and counter-rotating brush can also be rearranged and/or repositioned to other locations of the belt without departing from the scope of the invention. It is also understood that the shaping and configuration of the components described herein can also be modified such as in corresponding fashion to the sizing, configuration and construction of the belt and can also envision being adapted to continuously scrub and clean belts other than the inter-linked configuration described herein, such potentially including any type of smooth or aperture belt construction, such further including a belt which is either closed looped or continuously traversing in any linear or angled direction.

Variants of the present invention can include the cleaning mechanism as substantially depicted in FIG. 5 being retrofitted into an existing belt conveyor. Additional variants of the invention can also include the cleaning mechanism and conveyor being integrated into a single overall assembly at the point of manufacture.

Having described my invention, other and additional preferred embodiments will become apparent to those skilled in the art to which it pertains and without deviating from the scope of the appended claims.

I claim:

1. A cleaning mechanism for use with a closed loop conveyor belt supported in continuous traversing fashion, said mechanism comprising:
    a housing for supporting the belt;
    a frame mounted to said housing proximate to the belt;
    a drive shaft extending between spaced apart locations of said frame and including a pair of head sprockets adapted for supporting the belt at a selected location;
    a motor engaging said drive shaft;
    a counter weighted comb element pivotally secured to said frame, an upper angled combed edge of said comb element arrayed in spatial non-contacting fashion with a traversing exterior of the belt for capturing elongated shaving debris suspended from the belt; and
    a slave shaft extending between additional spaced apart location of said frame and which is rotated via a linkage with said drive shaft, pluralities of bristles extending from said slave shaft in a cylindrical arrangement such that selected width extending portions of said bristles are arranged in successive contact with the belt upon rotation of said slave shaft in order to scrub said belt.

2. The continuous belt cleaning mechanism as described in claim 1, said housing further comprising a pair of planar and widthwise spaced apart supports.

3. The continuous belt cleaning mechanism as described in claim 1, further comprising a pair of spaced apart receiving supports mounted to said spaced apart locations of said frame and through which said drive shaft passes, said receiving supports including internal bearings.

4. The continuous belt cleaning mechanism as described in claim 1, said counterweighted comb element further comprising a multi-sided elongated and planar body including a main portion having a bottom extending counterweight, intermediate planar side, and an upper end most interconnected planar extending side terminating in a forward serrated or corn edge with individual fingers.

5. The continuous belt cleaning mechanism as described in claim 4, further comprising a pair of rake arms position along opposite side edges of said comb element, said rake arms including both outer projecting and forward-most extending edges which contact the belt and which position said upper end most interconnecting planar side of said comb element in spatial and non-contacting fashion against the belt.

6. The continuous belt cleaning mechanism as described in claim 5, further comprising a sacrificial wear surface applied to said rake arms in engagement with the belt.

7. The continuous belt cleaning mechanism as described in claim 1, further comprising first and second sprocket wheels secured respectively to extending ends of said drive shaft and slave shaft, a chain interconnecting said sprocket wheel for transferring rotational momentum of said drive shaft to said slave shaft.

8. The continuous belt cleaning mechanism as described in claim 7, further comprising a pair of pillow blocks secured to said spaced apart locations of said frame and through which is supported said slaved shaft.

9. The continuous belt cleaning mechanism as described in claim 8, further comprising first and second pluralities of aligning and angled slot shaped apertures configured within said spaced apart locations, said pillow blocks being adjustable along said pluralities of apertures in order to positionally adjust said slave shaft and bristles relative to said belt.

10. The continuous belt cleaning mechanism as described in claim 1, further comprising said bristles being mounted to an outer sleeve supported about said slave shaft, a shear pin extending between said sleeve shaft and outer sleeve and which, upon jamming, allowing said rotating brush assemblies to become stationary.

11. A cleaning and deburring mechanism for retrofit installation into a conveyor assembly with a frame supporting a traveling belt, a motor driven drive shaft with a pair of head sprockets supporting width spaced locations of the belt at a redirecting location, said mechanism comprising:
    a counter weighted comb element adapted to being pivotally secured to the frame proximate the redirecting location, an edge of said comb element arrayed in spatial non-contacting fashion with a traversing exterior of the belt for capturing elongated shaving debris suspended from the belt; and a slave shaft adapted to extend between additional spaced apart location of the frame and which is rotated via a linkage with the drive shaft, pluralities of bristles extending from said slave shaft in a cylindrical arrangement such that selected width extending portions of said bristles are arranged in successive contact with the belt upon rotation of said slave shaft in order to scrub the belt.

12. The mechanism as described in claim 11, said counterweighted comb element further comprising a multi-sided elongated and planar body including a main portion having a bottom extending counterweight, an intermediate planar side, and an upper end most interconnected planar extending side terminating in a forward serrated or comb-like edge with individual fingers.

13. The mechanism as described in claim 12, further comprising a pair of rake arms position along opposite side edges of said comb element, said rake arms including both outer projecting and forward-most extending edges which contact the belt and which position said upper end most interconnecting planar side of said comb element in spatial and non-contacting fashion against the belt.

14. The mechanism as described in claim 13, further comprising a sacrificial wear surface applied to said rake arms in engagement with the belt.

15. The mechanism as described in claim 11, further comprising first and second sprocket wheels adapted to being secured respectively to extending ends of the drive shaft and said slave shaft, a chain interconnecting said sprocket wheel for transferring rotational momentum of the drive shaft to said slave shaft.

16. The mechanism as described in claim 15, further comprising a pair of pillow blocks adapted to being secured to the spaced apart locations of the frame and through which is supported said slaved shaft.

17. The mechanism as described in claim 16, further comprising first and second pluralities of aligning and angled slot shaped apertures configured within said spaced apart locations, said pillow blocks being adjustable along said pluralities of apertures in order to positionally adjust said slave shaft and bristles relative to the belt.

18. The mechanism as described in claim 11, further comprising said bristles being mounted to an outer sleeve supported about said slave shaft, a shear pin extending between said sleeve shaft and outer sleeve and which, upon jamming, allowing said rotating brush assemblies to become stationary.

19. A cleaning mechanism for use with a closed loop conveyor belt supported in continuous traversing fashion, said mechanism comprising:

a housing for supporting the belt;

a frame mounted to said housing proximate to the belt;

a drive shaft extending between spaced apart locations of said frame and including a pair of head sprockets adapted for supporting the belt at a directionally reversing location;

a motor engaging said drive shaft;

a comb element pivotally secured to said frame, an upper angled combed edge of said comb element arrayed in spatial non-contacting fashion with a traversing exterior of the belt for capturing elongated shaving debris suspended from the belt;

a slave shaft extending between additional spaced apart location of said frame and which is rotated via a linkage with said drive shaft including first and second sprocket wheels secured respectively to extending ends of said drive shaft and slave shaft, a chain interconnecting said sprocket wheel for transferring rotational momentum of said drive shaft to said slave shaft; and pluralities of bristles extending from said slave shaft in a cylindrical arrangement such that selected width extending portions of said bristles are arranged in successive contact with the belt upon rotation of said slave shaft in order to scrub said belt.

20. The continuous belt cleaning mechanism as described in claim 19, said comb element further comprising a multi-sided elongated and counterweighting planar body including a main portion having a bottom extending counterweight, an intermediate planar side, and an upper end most interconnected planar extending side terminating in a forward serrated or comb-like edge with individual fingers.

* * * * *